United States Patent [19]

Turetta et al.

[11] Patent Number: 5,481,169

[45] Date of Patent: Jan. 2, 1996

[54] DEVICE FOR CONTROLLING THE OPERATION OF AN APPLIANCE WITH A SERVO-ASSISTED MOTOR

[75] Inventors: Daniele Turetta, Ispra; Adriano Scaburri, Somma Lombardo, both of Italy

[73] Assignee: Whirlpool Corporation, Benton Harbor, Mich.

[21] Appl. No.: 46,051

[22] Filed: Apr. 12, 1993

[30] Foreign Application Priority Data

Apr. 14, 1992 [IT] Italy .................... MI92U0369

[51] Int. Cl.$^6$ .................................. G05B 11/01
[52] U.S. Cl. ........................... 318/560; 134/57 D
[58] Field of Search ............... 318/560, 3, 282; 68/12.16, 3 R; 307/139, 140; D32/28, 1–6; 134/57 D, 58 D, 56 R, 57 R

[56] References Cited

U.S. PATENT DOCUMENTS

| | | | |
|---|---|---|---|
| 4,218,898 | 8/1980 | Boyen et al. | 318/282 |
| 4,763,493 | 8/1988 | Nishite et al. | 68/12.16 |
| 5,034,671 | 7/1991 | Patton et al. | 318/560 |
| 5,079,489 | 1/1992 | Ishii | 318/560 |
| 5,150,489 | 9/1992 | Kaji et al. | 68/12.16 |
| 5,211,037 | 5/1993 | Adamski et al. | 68/12.16 |

Primary Examiner—William M. Shoop, Jr.
Assistant Examiner—Karen Masih
Attorney, Agent, or Firm—Thomas A. Schwyn; Joel M. Van Winkle

[57] ABSTRACT

A device for controlling the operation of a household electrical appliance such as a washing machine, dishwasher, cooking hob, oven or the like including an electronic circuit arranged to control the operation of the electrical appliance in accordance with predetermined program steps selected via a selector. This selector is a knob connected to a position sensing element associated with the electronic circuit and arranged to generate an electrical signal ($V_A$) on the basis of the angular position of the knob relative to an initial position or zero point. The electrical signal ($V_A$) is used by the electronic circuit in known manner to execute a predetermine wash program or the like or to control the operation of the electrical appliance. The electronic circuit further controls an actuator for moving the knob, so that the knob is made to move during the execution of the selected operating program and hence display the progress of the program.

14 Claims, 2 Drawing Sheets

DEVICE FOR CONTROLLING THE OPERATION OF AN APPLIANCE WITH A SERVO-ASSISTED MOTOR

BACKGROUND OF THE INVENTION

This invention relates to a device for controlling the operation of a household electrical appliance such as a washing machine, a dish-washer or the like or another household electrical appliance such as a glass-ceramic cooking hob, an oven or the like of the type comprising an electronic circuit for controlling the operation of said electrical appliance in accordance with predetermined program steps selected via a selector. With particular but non-limiting reference to the field of washing machines, dish-washers and the like, such a circuit is usually associated with a selector (of pushbutton, key or rotary type) which when positioned (or pressed) sets the electronic circuit to cause said machine to execute a particular wash program. Generally, when positioned to achieve the aforesaid purpose, said selector remains indefinitely in its set position until the user varies it by either changing it or moving the selector into its initial or zero position, ie by either generating further information or setting the electronic circuit to accept new information.

Alternatively, instead of said devices, usual electro-mechanical programmer devices are used in which a selector, generally a knob, is used to select the operation of a programmer member or timer (for example of mechanical type) such that this latter controls the operation of the washing machine or the like in the required manner. During the machine operation, this knob, which forms part of the timer, rotates to provide immediate visual information regarding the program under way and its residual duration. This rotation is achieved by usual cam members and other mechanical members.

SUMMARY OF THE INVENTION

An object of the present invention is to provide a programmer device of the aforesaid type (ie in which an electronic circuit controls the operation of the washing machine or the like or of another household electrical appliance) in which the progress of the selected wash program can be immediately observed by the user, such that he also knows the amount of time remaining to the end of the program.

A particular object of the invention is to provide a device of the aforesaid type which combines the advantages of an electronic programmer (ie reliability of program execution, constructional simplicity and low cost) with the advantages of a mechanical or electro-mechanical device (ie greater simplicity and ease of use for a normal user, greater aesthetic resemblance to usual long-available mechanical and like devices, and the immediately obvious traditional and hence widely known and more simple programming). These and further objects which will be apparent to the expert of the art are attained by a device of the aforesaid type, characterised in that the selector is a knob connected to a position sensing element associated with the circuit and arranged to generate an electrical signal on the basis of the angular position of said knob relative to an initial position or zero point, said electrical signal being used by the electronic circuit in known manner to execute a predetermined wash program or the like or to control the operation of the electrical appliance, said circuit controlling an actuator for moving the knob, so that the knob is made to move during the execution of the selected operating program and hence display the progress of said program.

BRIEF DESCRIPTION OF THE DRAWINGS

The present invention will be more apparent from the accompanying drawing, which is provided by way of non-limiting example and in which.

DESCRIPTION OF THE PREFERRED EMBODIMENT

Figure 1:
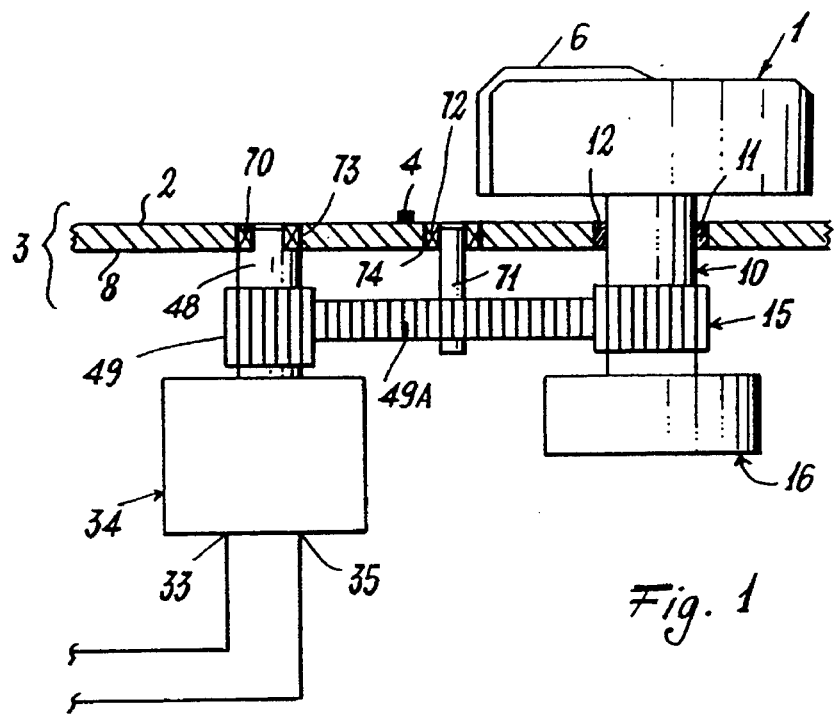
FIG. 1 is a partly sectional schematic side view of a part of the device according to the invention.
Figure 2:
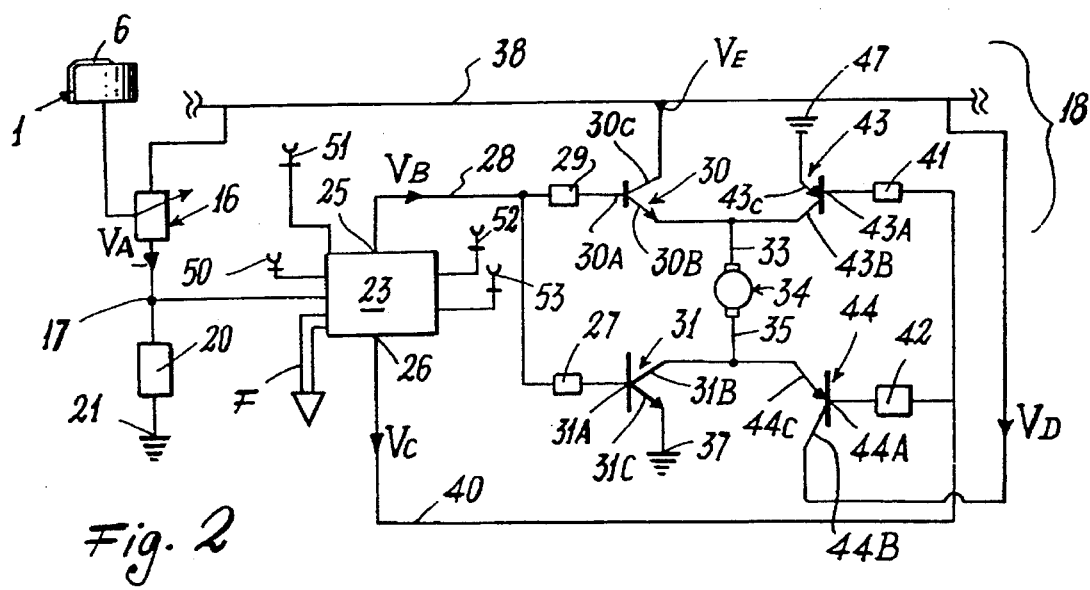
FIG. 2 is an electrical schematic diagram of a device according to the invention.
Figure 3:
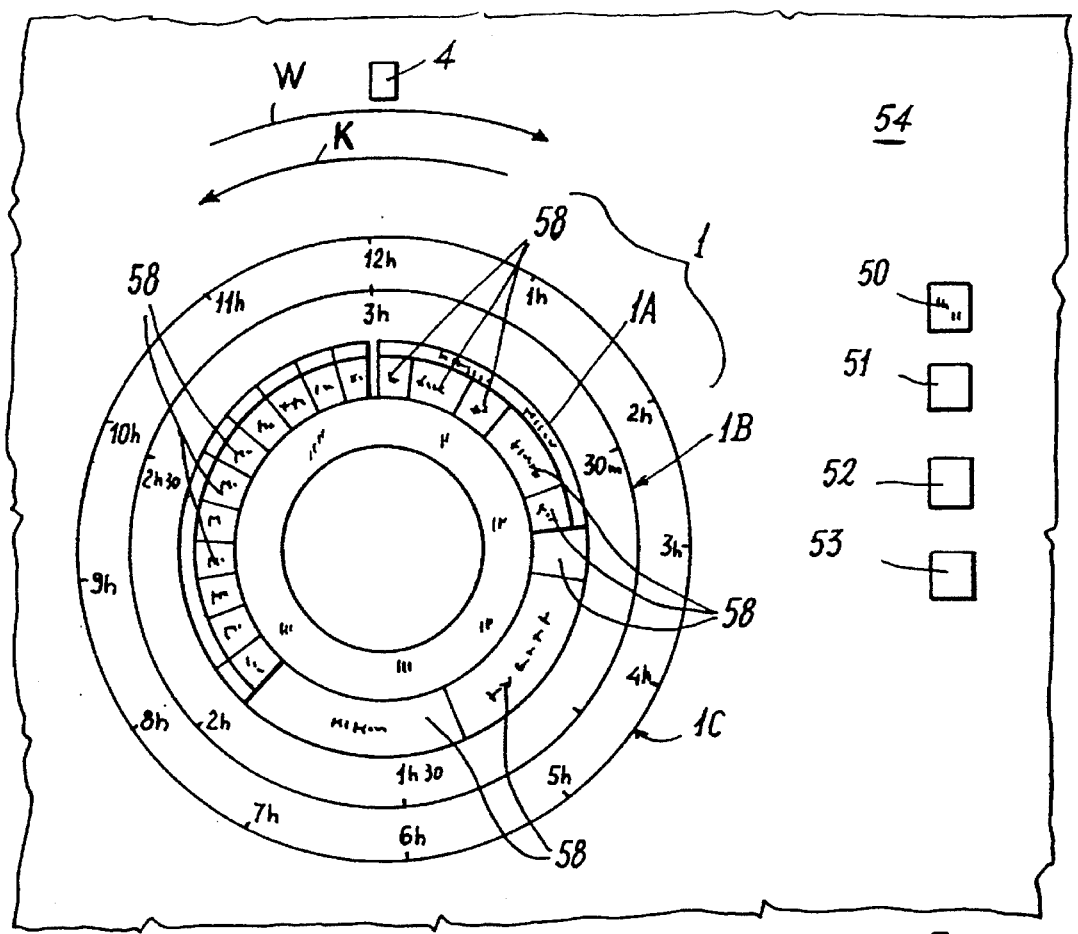
FIG. 3 is a front view of a machine control panel comprising the device according to the invention.

With reference to FIGS. 1, 2 and 3, the device of the invention comprises a knob 1 arranged in correspondence with a face 2 of a support bracket 3 associated with a usual washing machine cabinet or the like. On this face there is a notch 4 defining a reference mark for the initial position or zero point of the movement of the knob 1, which comprises a projection 6 cooperating with said notch or reference mark 4 to indicate the position of the knob relative to said reference mark; in other words the visual relationship between the notch 4 and the projection 6 indicates the current wash program stage under execution by the machine and the residual time remaining until its end.

The knob 1 is associated with a shaft 10 passing through a hole 11 in the bracket 3, where a known annular seal element 12 (through which the shaft 10 passes) is provided, this element also preferably acting as a mechanical decoupler member between the bracket and shaft, so allowing relative movement between them. For example, said element 12 can be a known ring of self-lubricating material. A gear wheel 15 is arranged on the shaft 10. The shaft is associated with an element 16 arranged to measure the angular position of the shaft 10 relative to a reference mark. The position of the knob relative to the notch 4 is evaluated in this manner. The measurement member is for example a variable resistor or potentiometer, as indicated in FIG. 2. Alternatively it can be a usual encoder or an angular transducer, or any known switch.

This element or (for example) potentiometer 16 is connected to a node 17 of an electronic circuit 18 arranged to control the operation of the washing machine or the like and the execution of predetermined wash programs.

A resistor 20 connected to earth at 21 is connected to the node 17 to define with the potentiometer 16 a voltage divider. A usual control unit 23 preferably of microprocessor type is also connected to the node 17. The microprocessor unit 23 comprises two outputs 25 and 26.

The output 25 is connected to an electrical branch 28 connected to two different resistors 27 and 29 which are connected to the bases 30A and 31A of two transistors 30 and 31. The emitter 30B of the transistor 30 is connected to one terminal 33 of an electric motor 34 (advantageously of direct current or stepping type), the other motor terminal 35 being connected to the collector 31B of the transistor 31. The emitter 31C of this latter is connected to earth at 37. Time collector 30C of the transistor 30 is connected to an electrical power line 38 to which the potentiometer 16 is also connected.

Likewise, the output 26 is connected to an electrical branch 40 connected to resistors 41 and 42 which are connected to the bases 43A and 44A of transistors 43 and 44. The collector 43B of the first transistor is connected to the terminal 33 of the motor 34, its emitter 43C being connected to earth at 47. The emitter 44C of the transistor 44 is connected to the terminal 35 of the motor 34, its collector 44B being connected to the line 38.

The microprocessor unit 23 controls the operation of the washing machine in known manner (as indicated by the arrow F of FIG. 2). Finally, the motor 34 comprises an output shaft 48 on which there is fixed a gear wheel 49 arranged to cooperate with the gear wheel 15 via an idle gear wheel 49A. The output shaft rotates within a bearing 70, the idle gear wheel 49A being associated with a shaft 71 rotating within a bearing 72. The bearings 71 and 72 are contained in seats 73 and 74 provided in that face 8 of the bracket 3 opposite the face 2 in correspondence with which the knob 1 is positioned.

The unit 23 is connected to four pushbuttons 50, 51, 52 and 53 arranged on a control panel 54 provided on the face 8 of the bracket 3 preferably to the side of the knob.

This latter comprises three concentric angular quadrants, namely a first quadrant 1A comprising a plurality of markings 58 relative to the various programs which can be effected by the washing machine (or the like), a second quadrant 1B showing the maximum duration of the various programs which can be executed by the machine, and a third quadrant 1C which is a usual clock quadrant. The various quadrants are to be used jointly with the pushbuttons 50, 51, 52 and 53 on choosing the desired wash program.

In this respect, it will be assumed that a washing machine provided with the described device is to be operated.

After loading the usual machine drum, the user firstly rotates the knob 1 in the direction W of FIG. 3 to position that marking 58 of the quadrant 1A relative to the required program in correspondence with the notch 4. The pushbutton 50 is then pushed to enable the microprocessor unit 23 to receive and memorize the required program in known manner. Advantageously a buzzer indicates when memorization has taken place.

The knob 1 is again rotated in the direction of the arrow W, to position the knob quadrant 1B such that one of the times indicated on it corresponds with the notch 4. The pushbutton 51 is then pushed. This operation programs a delay in the activation of the wash cycle, which can be an advantage for example from the energy saving viewpoint. Advantageously, a buzzer indicates when programming of the time delay in the unit 23 with which the pushbutton 51 is associated has taken place.

It should be noted that this unit senses the relative position of the knob on the control panel 54 by means of a signal V originating from the potentiometer 16 (or similar sensing element).

After the unit 23 has been "programmed" in the aforesaid manner, the pushbutton 52 is pressed, by which a "START" signal is fed to the microprocessor unit. This latter starts the wash program selected on the quadrant 1A of the knob 1, after the preset operation delay.

During the execution of the wash (or another selected washing machine function), the unit 23 operates the motor 34 such that this rotates the knob 1, to hence visually reproduce the operation of the machine and indicate the current wash stage.

To this end, the unit 23 generates at its output 25 a signal $V_B$ which reaches the bases of the transistors 30 and 31. These are thus saturated and enable the motor 34 to be fed electrically with signals $V_E$ and $V_D$ taken from the line 38. The transistors 43 and 44, the bases of which are not electrically fed, remain inhibited. The motor 34 rotates the gear wheel 49 which, by cooperating with the gear wheel 49A, rotates the gear wheel 15 operationally associated with the knob 1. This latter therefore rotates on the control panel 54, for example in the direction of the arrow W of FIG. 1.

If the user should require information concerning the prechosen wash program at any moment during its execution, he firstly operates the pushbutton 50. This causes the unit 23 to return the knob 1 to the wash program start position, after which he operates the pushbutton 53, which positions the knob such as to show the remaining program time on the quadrant 1C (the movement being in the opposite direction to the arrow W).

The unit 23 is able to achieve this because the knob 1 is not connected to any mechanical member determining particular connections or movements during the execution of the wash program. To achieve said movement of the knob 1, the unit 23 feeds a single signal $V_C$ along the electrical branch 40 to saturate the transistors 43 and 44 and maintain the transistors 36 and 31 inhibited. The motor, which is hence powered in the opposite direction to that which moves the knob 1 in the direction of the arrow W of FIG. 3, now moves the knob in the opposite direction (indicated by the arrow K in FIG. 3). In this manner the knob is able to position itself rapidly at the markings 58 and the times indicated on its quadrants 1A and 1B.

If the user wishes to change program during the execution of a prechosen wash program, he rotates the knob 1 until the marking 58 relative to the required program on the quadrant 1A reaches the notch 4. He then presses the pushbutton 50, with the result that the new program is memorized in known manner by the unit 23, which then executes it.

Finally, it should be noted that the microprocessor unit 23 is aware of the relative angular position of the knob 1 on the control panel 54 at every moment during the execution of the wash program. This is achieved by the sensor element 16. On termination of the wash program, the unit 23 generates no further signals $V_B$ and $V_C$ towards the transistors 30, 31, 43 and 44, with the result that these latter, now inhibited, switch off power to the motor 34, which hence stops.

Figure 4:
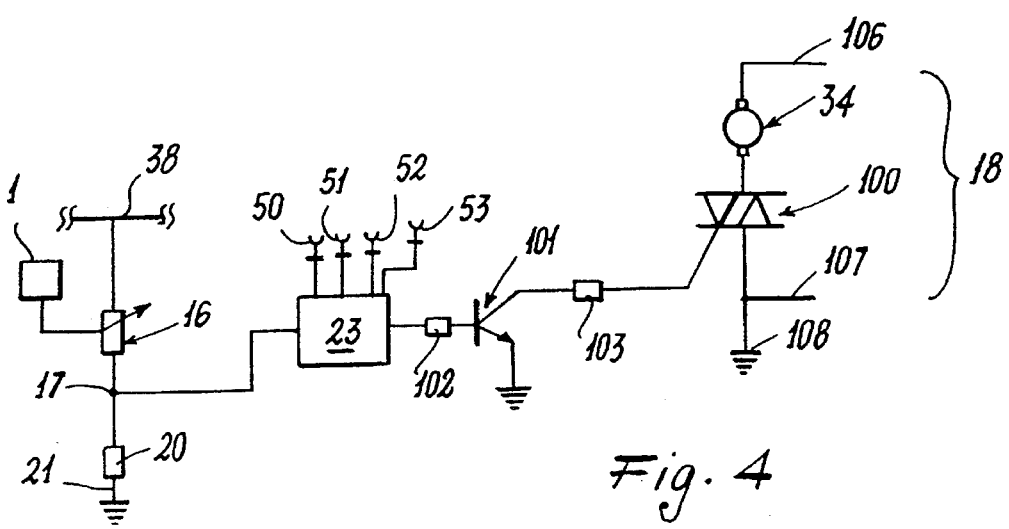
FIG. 4 is an electrical schematic diagram of a modified embodiment of the device according to the invention.

FIG. 4 shows a modification of the invention. In this figure (in which parts corresponding to those of FIGS. 1, 2 and 3 are indicated by the same reference numerals) the motor is controlled by a bidirectional static switch or triac 100. This latter is itself controlled by a transistor 101 connected to the output 25 of the microprocessor unit 23. Protection resistors 102 and 103 are connected between the transistor and the triac and between the unit 23 and the transistor.

The motor 34, which in the example is of the alternating current type, is hence powered via a phase line 106 and a neutral line 107, and is connected to earth at 108 via the triac. The circuit 18 in the form shown in FIG. 4 operates exactly as that of FIG. 2. However, the motor 34 can be controlled to rotate in a single direction depending on whether the triac 100 connects the motor to the line 107 and to earth, or not. Different embodiments of the invention have been described. Other embodiments are however possible (such as that in which the quadrants 1A, 1B and 1C of the knob 1 are provided on separate concentric ring nuts operated selectively by the motor 1), these falling within the scope of the present document.

The device of the invention can also be advantageously applied to household electrical appliances other than washing machines, such as glass ceramic cooking hobs, ovens and the like. With reference to cooking hobs, the device of the present invention can be validly used to clearly indicate to the user the variation in the power level of the heating element caused by a usual known protection device associated with this element.

We claim:

1. A device for controlling the operation of a household electrical appliance, comprising:

an electronic circuit arranged to control the operation of said electrical appliance;

a selector for inputting predetermined program steps to said electronic control, said selector including:

a knob;

a position sensing element mechanically interconnected to said knob, said position sensing element supplying an electrical input signal to said electronic circuit responsive to the angular position of said knob relative to an initial position, said electrical input signal being used by said electronic circuit to control the operation of the electrical appliance;

an actuator operatively controlled by said circuit for moving said knob, so that said knob is made to move during the execution of the selected operating program and hence display the progress of said program.

2. A device as claimed in claim 1, wherein the position sensing element further comprises a variable resistor on which the knob acts.

3. A device as claimed in claim 1, wherein the position sensing element is an encoder interconnected with a shaft extending from the knob.

4. A device as claimed in claim 1, wherein the position sensing element is at least one switch interconnected with a shaft extending from the knob.

5. A device as claimed in claim 1, further comprising:

a support including an electrical appliance control panel, said control panel providing a face of said support, said knob being positioned in correspondence with said face, said face having an indicator and said knob having a reference marker such that the visual relationship between said indicator and said reference marker is apparent, said knob having a shaft passing through a hole in said support within a seal element acting as a mechanical decoupler.

6. A device as claimed in claim 5, further wherein:

a gear wheel is drivingly interconnected with said shaft extending from said knob; and a corresponding gear wheel, arranged to engage said gear wheel, is driven by the actuator.

7. A device as claimed in claim 5, wherein the knob is independent of actuator members involved in the operation of the household electrical appliance and is free to move relative to the control panel.

8. A device as claimed in claim 5, wherein the control panel includes an interface comprising at least two pushbuttons arranged to set a control unit for the household electrical appliance.

9. A device as claimed in claim 1, wherein the knob comprises several concentric annular quadrants.

10. A device as claimed in claim 9, wherein the quadrants are independent of each other and are movable relative to each other.

11. A device as claimed in claim 1, wherein the actuator for moving the knob is an electric motor.

12. A device as claimed in claim 1, wherein the actuator for moving the knob is an alternating current electric motor.

13. A device as claimed in claims 1 or 9, wherein the appliance control circuit comprises a microprocessor unit which is connected via switching members to the actuator for moving the knob.

14. A device as claimed in claim 13, wherein the switching members are static switches.

* * * * *